US009137646B2

(12) United States Patent
Kundu et al.

(10) Patent No.: US 9,137,646 B2
(45) Date of Patent: Sep. 15, 2015

(54) METHOD AND FRAMEWORK TO DETECT SERVICE USERS IN AN INSUFFICIENT WIRELESS RADIO COVERAGE NETWORK AND TO IMPROVE A SERVICE DELIVERY EXPERIENCE BY GUARANTEED PRESENCE

(71) Applicant: Kodiak Networks, Inc., San Ramon, CA (US)

(72) Inventors: Gorachand Kundu, Karnataka (IN); Krishnakant M. Patel, Richardson, TX (US); Harisha Mahabaleshwara Negalaguli, Richardson, TX (US); Kandula Ramu, Bangalore (IN); Ravi Ayyasamy, Richardson, TX (US)

(73) Assignee: Kodiak Networks, Inc., San Ramon, CA (US)

( * ) Notice: Subject to any disclaimer, the term of this patent is extended or adjusted under 35 U.S.C. 154(b) by 98 days.

(21) Appl. No.: 14/093,240

(22) Filed: Nov. 29, 2013

(65) Prior Publication Data

US 2014/0148210 A1 May 29, 2014

Related U.S. Application Data

(60) Provisional application No. 61/730,856, filed on Nov. 28, 2012.

(51) Int. Cl.
*H04B 7/00* (2006.01)
*H04W 4/10* (2009.01)
(Continued)

(52) U.S. Cl.
CPC .......... *H04W 4/10* (2013.01); *H04L 67/24* (2013.01); *H04L 67/36* (2013.01); *H04W 76/00* (2013.01); *H04W 76/005* (2013.01)

(58) Field of Classification Search
CPC ...... H04W 4/10; H04W 78/00; H04W 76/005
USPC ......... 455/518, 519, 520, 521, 507, 500, 517, 455/445, 511, 550.1, 403, 416, 422.1, 455/426.1, 426.2, 414.1–414.4, 560; 370/259, 261, 262, 265, 328, 329, 343, 370/310
See application file for complete search history.

(56) References Cited

U.S. PATENT DOCUMENTS

| 3,912,874 A | 10/1975 | Botterell et al. |
| 4,796,293 A | 1/1989 | Blinken et al. |

(Continued)

FOREIGN PATENT DOCUMENTS

| GB | 2338150 | 12/1999 |
| JP | 2003-92776 | 3/2003 |

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

(Continued)

*Primary Examiner* — Keith Ferguson
(74) *Attorney, Agent, or Firm* — Gates & Cooper LLP

(57) ABSTRACT

A system and method for providing advanced voice services in a wireless communications network. The system includes at least one server that exchanges messages with mobile units, in order to indicate that a user is neither online or offline, but is temporarily unreachable or unavailable. The user may be temporarily unreachable or unavailable due to connectivity issues with the user's mobile unit in the wireless communications network. Presence information for the user is distributed from the server to watchers, wherein the presence information indicates that the user is offline when the user is temporarily unreachable or unavailable. Various techniques may be implemented to determine how long the user's mobile unit must remain connected to the wireless communications network, before the presence information indicates that the user is online.

15 Claims, 13 Drawing Sheets

(51) Int. Cl.
*H04L 29/08* (2006.01)
*H04W 76/00* (2009.01)

(56) References Cited

U.S. PATENT DOCUMENTS

| | | |
|---|---|---|
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, III et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 5/2006 | Chaturvedi et al. |
| 7,082,316 B2 | 7/2006 | Eiden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskyj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0021400 A1 | 1/2003 | Grandgent et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Wetman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |
| 2006/0128411 A1 | 6/2006 | Turcanu |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | LaDue |
| 2006/0234687 A1 | 10/2006 | Patel et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0099609 A1 | 5/2007 | Cai |
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2007/0288621 A1* | 12/2007 | Gundu et al. ............... 709/223 |
| 2008/0064364 A1 | 3/2008 | Patel et al. |
| 2008/0126230 A1 | 5/2008 | Bellora et al. |
| 2008/0147671 A1 | 6/2008 | Simon et al. |

(56) References Cited

U.S. PATENT DOCUMENTS

| | | |
|---|---|---|
| 2008/0299953 A1 | 12/2008 | Rao |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2013/0155875 A1 | 6/2013 | Ayyasamy et al. |
| 2013/0196706 A1 | 8/2013 | Patel et al. |
| 2013/0337859 A1 | 12/2013 | Patel et al. |
| 2014/0148210 A1 | 5/2014 | Kundu et al. |

FOREIGN PATENT DOCUMENTS

| | | |
|---|---|---|
| WO | 00/69189 | 11/2000 |
| WO | 00/79825 | 12/2000 |
| WO | 01/67674 | 9/2001 |
| WO | 02/101981 | 12/2002 |
| WO | 03/101007 | 12/2003 |
| WO | 2005/009006 | 1/2005 |
| WO | 2005/112494 | 11/2005 |
| WO | 2005/115032 | 12/2005 |
| WO | 2005/117474 | 12/2005 |
| WO | 2006/105287 | 10/2006 |
| WO | 2010/048217 | 4/2010 |
| WO | 2010/117815 | 10/2010 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", trackwell.com, Oct. 2002, pp. 1-1. XP002345781 http://www.trackwell.com/news/news_twandtetra.htm.

* cited by examiner

METHOD AND FRAMEWORK TO DETECT SERVICE USERS IN AN INSUFFICIENT WIRELESS RADIO COVERAGE NETWORK AND TO IMPROVE A SERVICE DELIVERY EXPERIENCE BY GUARANTEED PRESENCE

CROSS REFERENCE TO RELATED APPLICATIONS

This application claims the benefit under 35 U.S.C. Section 119(e) of the following co-pending and commonly-assigned patent application:

U.S. Provisional Application Ser. No. 61/730,856, filed Nov. 28, 2012, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE,";

which application is incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK,", now U.S. Pat. No. 7,787,896, issued Aug. 31, 2010, which application claims the benefit under 35 U.S.C. Section 365 of P.C.T. International Application Serial Number PCT/US03/16386 (154.4-WO-U1), which application claims the benefit under 35 U.S.C. Section 119(e) of U.S. Provisional Application Ser. Nos. 60/382,981 (154.3-US-P1), 60/383,179 (154.4-US-P1) and 60/407,168 (154.5-US-P1);

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS,", which application claims the benefit under 35 U.S.C. Section 365 of P.C.T. International Application Serial Number PCT/US04/23038 (154.7-WO-U1), which application claims the benefit under 35 U.S.C. Section 119(e) of U.S. Provisional Application Ser. Nos. 60/488,638 (154.7-US-P1), 60/492,650 (154.8-US-P1) and 60/576,094 (154.14-US-P1) and which application is a continuation-in-part and claims the benefit under 35 U.S.C. Sections 119, 120 and/or 365 of P.C.T. International Application Serial Number PCT/US03/16386 (154.4-WO-U1);

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS,", now U.S. Pat. No. 7,738,892, issued Jun. 15, 2010, which application claims the benefit under 35 U.S.C. Section 119(e) of U.S. Provisional Application Ser. Nos. 60/569,953 (154.9-US-P1) and 60/579,309 (154.15-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS,", now U.S. Pat. No. 7,403,775, issued Jul. 22, 2008, which application claims the benefit under 35 U.S.C. Section 119(e) of U.S. Provisional Application Ser. No. 60/571,075 (154.10-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK,", now U.S. Pat. No. 7,764,950, issued Jul. 27, 2010, which application claims the benefit under 35 U.S.C. Section 119(e) of U.S. Provisional Application Ser. Nos. 60/573,059 (154.11-US-P1) and 60/576,092 (154.12-US-P1), and which application is a continuation-in-part and claims the benefit under 35 U.S.C. Sections 119, 120 and/or 365 of U.S. Utility application Ser. No. 10/515,556 (154.4-US-WO), P.C.T. International Application Serial Number PCT/US04/23038 (154.7-WO-U1), U.S. Utility application Ser. No. 11/126,587 (154.9-US-U1), and U.S. Utility application Ser. No. 11/129,268 (154.10-US-U1);

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS,", now U.S. Pat. No. 7,738,896, issued Jun. 15, 2010, which application claims the benefit under 35 U.S.C. Section 119(e) of U.S. Provisional Application Ser. No. 60/573,780 (154.13-US-P1), and which application is a continuation-in-part and claims the benefit under 35 U.S.C. Sections 119, 120 and/or 365 of U.S. Utility application Ser. No. 10/515,556 (154.4-US-WO), P.C.T. International Application Serial Number PCT/US04/23038 (154.7-WO-U1), U.S. Utility application Ser. No. 11/126,587 (154.9-US-U1), and U.S. Utility application Ser. No. 11/134,883 (154.11-US-U1);

U.S. Utility application Ser. No. 11/158,527, filed Jun. 22, 2005, by F. Craig Farrill, entitled "PRESS-TO-CONNECT FOR WIRELESS COMMUNICATIONS SYSTEMS,", now U.S. Pat. No. 7,529,557, issued May 5, 2009, which application claims the benefit under 35 U.S.C. Section 119(e) of U.S. Provisional Application Ser. No. 60/581,954 (154.16-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS,", which application claims the benefit under 35 U.S.C. Section 119(e) of U.S. Provisional Application Ser. No. 60/588,464 (154.17-US-P1);

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS,", now U.S. Pat. No. 7,813,722, issued Oct. 12, 2010, which application claims the benefit under 35 U.S.C. Section 119(e) of U.S. Provisional Application Ser. No. 60/654,271 (154.18-US-P1);

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424 (154.19-US-P1);

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat. No. 7,689,238, issued Mar. 30, 2010, which application claims the benefit under 35 U.S.C. Section 119(e) of U.S. Provisional Application Ser. No. 60/705,115 (154.20-US-P1);

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265 (154.21-US-P1);

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250 (154.23-US-P1);

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090 (154.26-US-P1);

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521 (154.27-US-P1);

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 (154.32-US-P1) and 61/023,042 (154.32-US-P2);

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," attorneys', which application claims the benefit under 35 U.S.C. Section 119(e) of U.S. Provisional Application Ser. No. 61/023,332 (154.33-US-P1);

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS,", which application claims the benefit under 35 U.S.C. Section 119(e) of U.S. Provisional Application Ser. No. 61/106,689 (154.36-US-P1);

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," which application is a continuation-in-part and claims the benefit under 35 U.S.C. Sections 119, 120 and/or 365 of U.S. Utility application Ser. No. 12/582,601 (154.36-US-U1);

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," now U.S. Pat. No. 8,498,660, issued Jul. 30, 2013, which application claims the benefit under 35 U.S.C. Section 119(e) of U.S. Provisional Application Ser. Nos. 61/164,754 (154.39-US-P1) and 61/172,129 (154.39-US-P2);

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," attorneys', which application claims the benefit under 35 U.S.C. Section 119(e) of U.S. Provisional Application Ser. No. 61/266,896 (154.40-US-P1);

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PRE-PAID BILLING SOLUTIONS FOR PUSH-TO-TALK IN A WIRELESS COMMUNICATIONS NETWORK," now U.S. Pat. No. 8,369,829, issued Feb. 5, 2013, which application claims the benefit under 35 U.S.C. Section 119(e) of U.S. Provisional Application Ser. No. 61/310,245 (154.41-US-P1);

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (POC) CALL SETUP OPTIMIZATIONS,", now U.S. Pat. No. 8,478,261, issued Jul. 2, 2013, which application claims the benefit under 35 U.S.C. Section 119(e) of U.S. Provisional Application Ser. No. 61/347,217, filed May 21, 2010, by Brahmananda R. Vempati, Krishnakant M. Patel, Pratap Chandana, Anand Narayanan, and Ravi Ayyasamy, entitled "PREDICTIVE WAKEUP FOR PUSH-TO-TALK-OVER-CELLULAR (POC) CALL SETUP OPTIMIZATIONS,";

U.S. Utility application Ser. No. 13/710,683, filed Dec. 11, 2012, by Ravi Ayyasamy, Gorachand Kundu, Krishnakant M.

Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC)," , which application claims the benefit under 35 U.S.C. Section 119(e) of U.S. Provisional Application Ser. No. 61/570,694, filed Dec. 14, 2011, by Ravi Ayyasamy, Gorachand Kundu, Krishnakant M. Patel, Brahmananda R. Vempati, Harisha Mahabaleshwara Negalaguli, Shiva Koteshwara Kiran Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC),";

U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS," , which application claims the benefit under 35 U.S.C. Section 119(e) of U.S. Provisional Application Ser. No. 61/659,292, filed Jun. 13, 2012, by Krishnakant M. Patel, Brahmananda R. Vempati, Anand Narayanan, and Gregory J. Morton, entitled "PUSH-TO-TALK CASE OR SLEEVE FOR CONVERTING GENERIC DEVICES TO FUNCTION LIKE PURPOSE-BUILT PUSH-TO-TALK DEVICES," ; U.S. Provisional Application Ser. No. 61/682,524, filed Aug. 13, 2012, by Krishnakant M. Patel, Brahmananda R. Vempati, Anand Narayanan, and Gregory J. Morton, entitled "RUGGEDIZED PUSH-TO-TALK (PTT) CASE," ; and U.S. Provisional Application Ser. No. 61/705,748, filed Sep. 26, 2012, by Krishnakant M. Patel, Brahmananda R. Vempati, Anand Narayanan, Gregory J. Morton, and Ravi Ayyasamy, entitled "PUSH-TO-TALK CASE OR SLEEVE FOR CONVERTING GENERIC DEVICES TO FUNCTION LIKE PURPOSE-BUILT PUSH-TO-TALK DEVICES," ; and U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC)," , which application claims the benefit under 35 U.S.C. Section 119(e) of U.S. Provisional Application Ser. No. 61/593,485, filed Feb. 1, 2012, by Krishnakant M. Patel, Harisha Mahabaleshwara Negalaguli, Brahmananda R. Vempati, Shiva Koteshwara Kiran Cheedella, Arun Velayudhan, Raajeev Kuppa, and Gorachand Kundu, entitled "WiFi INTERWORKING SOLUTIONS FOR PUSH-TO-TALK OVER CELLULAR (PoC) IN THE OPEN MOBILE ALLIANCE (OMA) STANDARD,";

all of which applications are incorporated by reference herein.

BACKGROUND OF THE INVENTION

1. Field of the Invention

This invention relates in general to advanced voice services in wireless communications networks, and more specifically, to a method and framework to detect service users in an insufficient wireless radio coverage network and to improve a service delivery experience by guaranteed presence.

2. Description of Related Art

Advanced voice services (AVS), also known as Advanced Group Services (AGS), such as two-way half-duplex voice calls within a group, also known as Push-to-Talk-over-Cellular (PoC), Push-to-Talk (PTT), or Press-to-Talk (P2T), as well as other AVS functions, such as Push-to-Conference (P2C) or Instant Conferencing, Push-to-Message (P2M), etc., are described in the co-pending and commonly-assigned patent applications cross-referenced above and incorporated by reference herein. These AVS functions have enormous revenue earnings potential for wireless communications systems, such as cellular networks and personal communications systems (PCS) networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G, 4G, LTE, etc.

Nonetheless, there is a need in the art for improvements to the methods and systems for delivering the advanced voice services, such as PoC, that comply with both existing and emerging wireless packet-based standards and yet provide superior user experiences. Many existing implementations of PoC suffer from an inferior user experience. The present invention satisfies the need for a superior user experience, and also defines procedures for practical implementation of PoC in commercial, standards-based, cellular networks, with a focus on features such as WiFi interworking solutions.

SUMMARY OF THE INVENTION

To overcome the limitations in the prior art described above, and to overcome other limitations that will become apparent upon reading and understanding the present specification, the present invention discloses a system and method for providing advanced voice services in one or more wireless communications networks, such as cellular mobile phone networks, wireless data networks and WiFi networks.

The system comprises one or more servers that interface to the wireless communications networks to perform advanced voice services for one or more mobile units in the wireless communications networks, wherein the advanced voice services include an instant two-way half-duplex voice call within a group of the mobile units comprising a Push-to-Talk-over-Cellular (PoC) call session. Both the servers and the mobile units that use the advanced group services communicate with each other using control messages within the wireless communications networks, and at least one of the servers switches voice messages for the advanced group services between the mobile units across the wireless communications networks. At least one of the servers manages the PoC call session by acting as an arbitrator for the PoC call session and controls the sending of the control messages and the voice messages to and from the mobile units.

In one embodiment of the present invention, at least one of the servers exchanges messages with the mobile units, in order to indicate that a user is neither online or offline, but is temporarily unreachable or unavailable. The user that is temporarily unreachable or unavailable has an internal presence state called a "Temporary Unreachable" (TU) state. The user may be temporarily unreachable or unavailable due to connectivity issues with the user's mobile unit in the wireless communications networks.

Presence information for the user is distributed from at least one of the servers to one or more watchers, such as other mobile units. Specifically, the presence information for the user distributed to the watchers indicates that the user is offline when the user is temporarily unreachable or unavailable.

The user's mobile unit itself may detect that the user is temporarily unreachable or unavailable. Thereafter, the user's mobile unit sends one or more messages to at least one of the servers to indicate that the user is online, after the user has been temporarily unreachable or unavailable, wherein the messages comprise a presence publication, a call origination, or an alert origination. One or more timers may be implemented to determine how long the user's mobile unit must remain connected to the wireless communications networks, before the user's mobile sends a message to at least one of the servers to indicate that the user is online.

In addition, at least one of the servers may detect that the user is temporarily unreachable or unavailable. For example, at least one of the servers unsuccessfully communicates messages with the user's mobile unit for a configured number of times at configured intervals, before it determines that the user is temporarily unreachable or unavailable. In another example, at least one of the servers successfully communicates messages with the user's mobile unit for a configured number of times at configured intervals, before it determines that the user is online, after the user has been temporarily unreachable or unavailable. In this regard, the messages may comprise a presence notification, a call termination, or an alert termination.

BRIEF DESCRIPTION OF THE DRAWINGS

Referring now to the drawings in which like reference numbers represent corresponding parts throughout.

DETAILED DESCRIPTION OF THE INVENTION

Figure 1:
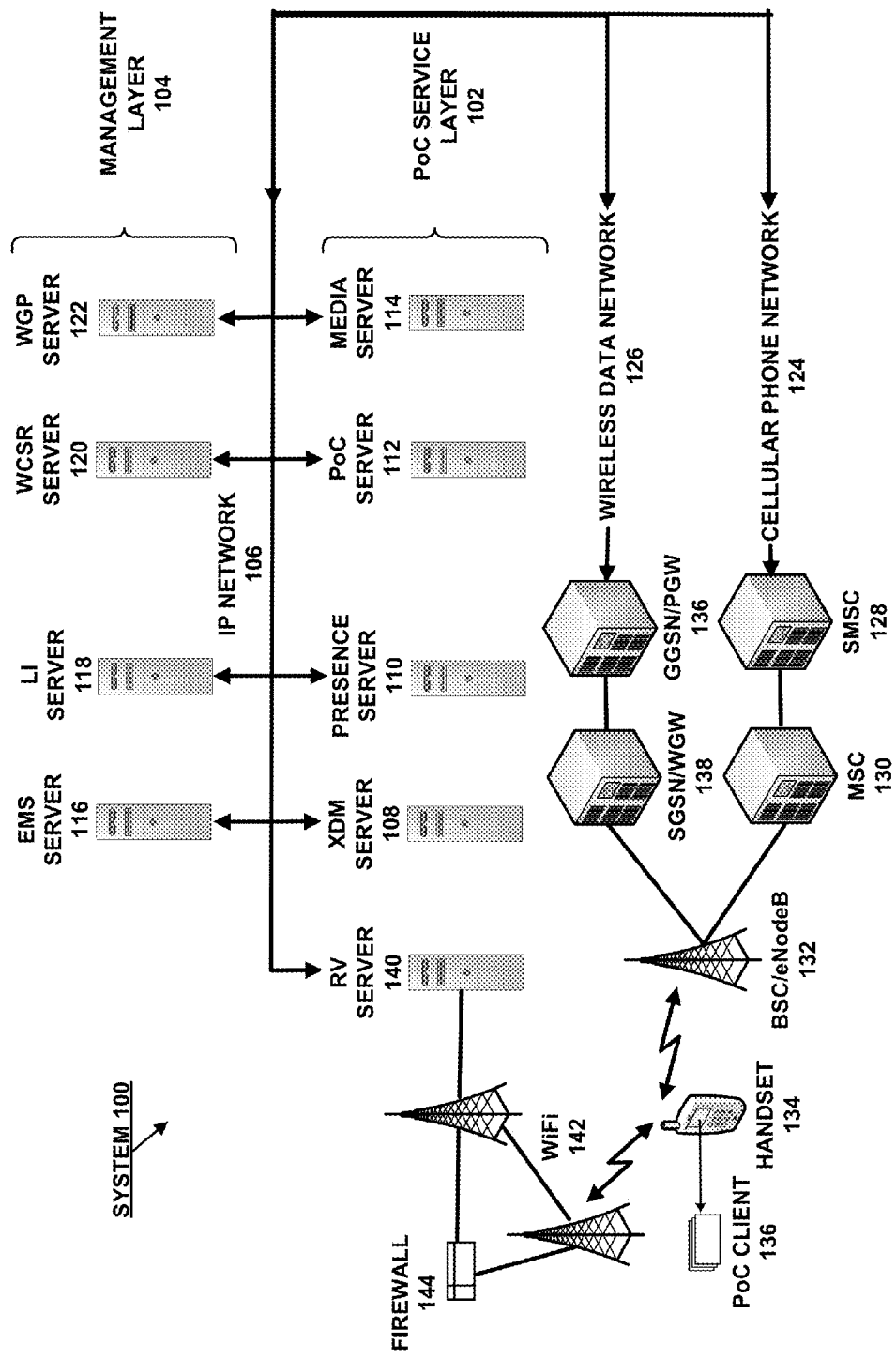
FIG. 1 is a block diagram that illustrates an exemplary embodiment of a wireless communications network according to a preferred embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| GPRS | General Packet Radio Service |
| GSM | Global System for Mobile communications |
| HTTP | Hypertext Transport Protocol |
| HTTPS | Secure Hypertext Transport Protocol |
| IMSI | International Mobile Subscriber Identity |
| IP | Internet Protocol |
| IPA | Instant Personal Alert |
| MBCP | Media Burst Control Protocol |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PoC | Push-to-talk-over-Cellular |
| PGW | Packet Gate Way |
| PTT | Push-To-Talk |
| RTCP | Realtime Transport Control Protocol |
| RTP | Realtime Transport Protocol |
| SDP | Session Description Protocol |
| SIM | Subscriber Identity Module |
| SIP | Session Initiation Protocol |
| SMMP | Short message peer-to-peer protocol |
| SMS | Small message service |
| URI | Uniform Resource Identifier |
| VoIP | Voice-over-IP |
| WGW | Wireless Gate Way |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
| --- | --- |
| 1-1 PoC Session | A feature enabling a PoC User to establish a PoC Session with another PoC User. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |

| Term | Description |
|---|---|
| Corporate Administrator | A user who manages corporate subscribers, their contacts and groups. |
| Firewall | A device that acts as a barrier to prevent unauthorized or unwanted communications between computer networks and external devices. |
| Home PoC Server | The PoC Server of the PoC Service Provider that provides PoC service to the PoC User. |
| Instant Personal Alert | A feature in which a PoC User sends a SIP based instant message to a PoC User requesting a 1-1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signalling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |
| Pre-Arranged PoC Group | A persistent PoC Group. The establishment of a PoC Session to a Pre-Arranged PoC Group results in the members being invited. |
| Pre-Established Session | The Pre-Established Session is a SIP Session established between the PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |
| Watcher | Any uniquely identifiable entity that requests Presence Information about a Presentity from the Presence Service. |
| WiFi | A wireless local area network (WLAN). |

2 System Architecture

FIG. 1 illustrates the system architecture used in the present invention. This architecture conforms to the Advanced Telecommunications Computing Architecture (ATCA) standard to support the advanced voice services of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 (also referred to as a mobile unit, mobile station, mobile phone, cellular phone, etc.) executing a PoC Client 136. The wireless data network 126, depending on its type, e.g., GPRS or 4G/LTE, includes one or more Gateway GPRS Support Nodes (GGSNs) or Packet Gateways (PGWs) 136 and Serving GPRS Support Nodes (SGSNs) or Wireless GateWays (WGWs) 138, which also communicate with customer handsets 134 via BSCs or eNodeBs 132.

Finally, in one embodiment of the present invention, the PoC Service Layer 102 and Management Layer 104 are connected to one or more RendeVous (RV) Servers 140, which are coupled to one or more WiFi networks 142, in order to communicate with one or more PoC Clients 136 on one or more handsets 134. Note that the WiFi networks 142 are IP networks, which may be implemented in a single network or as separate networks, and may include one or more Firewalls 144.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:

The GGSN/PGW 136 transfers IP packets between the PoC Client 136 and the various servers:
SIP/IP signaling messages between the PoC Server 112 and PoC Client 136 for control traffic exchange (i.e., control packets) for PoC call sessions.
RTP/IP, RTCP/IP and MBCP/IP packets between the Media Server 114 and PoC Client 136 for bearer traffic exchange (i.e., voice packets) for PoC call sessions.
SIP/IP signaling messages between the Presence Server 110 and PoC Client 136 for presence information.
XCAP/HTTP/IP and SIP/IP signaling between the XDM Server 108 and PoC Client 136 for document management.
The SMSC 128 handles authentication:
The XDM Server 108 communicates with the SMSC 128 via SMPP/IP for receiving the authentication code required for PoC Client 136 activation from the handset 134.

2.3 WiFi Network

The PoC Service Layer 102 also interacts with the following entities on the WiFi network 142:

The RV Server 140 transfers IP packets between the PoC Client 136 and the various servers:
SIP/IP signaling messages between the PoC Server 112 and PoC Client 136 for control traffic exchange (i.e., control packets) for PoC call sessions.
RTP/IP, RTCP/IP and MBCP/IP packets between the Media Server 114 and PoC Client 136 for bearer traffic exchange (i.e., voice packets) for PoC call sessions.
SIP/IP signaling messages between the Presence Server 110 and PoC Client 136 for presence information.
XCAP/HTTP/IP and SIP/IP signaling between the XDM Server 108 and PoC Client 136 for document management.
SIP/IP signaling messages between the XDM Server 108 and PoC Client 136 for receiving the authentication code required for PoC Client 136 activation from the handset 134.

2.4 PoC Service Layer Elements

As noted above, the PoC Service Layer 102 is comprised of the following elements:
PoC Server 112,
Media Server 114,
Presence Server 110,
XDM Server 108, and
RV Server 140.

These elements are described in more detail below.

2.4.1 PoC Server

The PoC Server 112 handles the PoC call session management and is the core for managing the PoC services for the PoC Clients 136 using SIP protocol. The PoC Server 112 implements a Control Plane portion of Controlling and Participating PoC Functions. A Controlling PoC Function acts as an arbitrator for a PoC Session and controls the sending of control and bearer traffic by the PoC Clients 136. A Participating PoC Function relays control and bearer traffic between the PoC Client 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during PoC call sessions.

2.4.3 Presence Server

The Presence Server 110 implements a presence enabler for the PoC Service. The Presence Server 110 accepts, stores and distributes Presence Information for Presentities, such as PoC Clients 136.

The Presence Server 110 also implements a Resource List Server (RLS), which accepts and manages subscriptions to Presence Lists. Presence Lists enable a "watcher" application to subscribe to the Presence Information of multiple Presentities using a single subscription transaction.

The Presence Server 110 uses certain XDM functions to provide these functions, which are provided by XDM Server 108.

2.4.4 XDM Server

The XDM Server 108 implements an XDM enabler for the PoC Service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 RV Server

The RV Server 140 implements a WiFi interworking solution for the PoC Service to communicate via one or more WiFi network 142 access points to the PoC Clients 136. Specifically, the RV Server 140 provides PoC Service over a WiFi network 142 (or similar Internet environments), and supports a seamless user experience while the transport of IP control messages and IP voice data is transitioned between different types of wireless communications networks, such as wireless data networks 126 comprising cellular data packet networks and WiFi networks 142. The RV Server 140 also resolves security concerns that arise with such WiFi interworking solutions.

This is necessary because the quality, performance and availability of the wireless data networks 126 typically vary from location to location based on various factors. In addressing these issues, the WiFi interworking solution implemented by the RV Server 140 provides following benefits:

- PoC Services becomes available even in those locations where a wireless data network 126 is not available, but where a general purpose WiFi network 142 is available. This is particularly more useful in enhancing in-building coverage for the PoC Service.
- By connecting over the WiFi network 142, the available IP bandwidth, quality and performance can be more streamlined and controlled since the WiFi network 142 (typically) has a greater capacity and throughput as compared to the wireless data network 126, which is more shared in nature.
- By utilizing the greater available bandwidth over the WiFi network 142, as compared to the wireless data network 126, it is possible to provide additional services (such as sharing large files) which otherwise is inefficient and costly on wireless data networks 126.

These and other aspects of the WiFi interworking solution are described in more detail below.

2.5 Management Layer Elements

As noted above, the Management Layer 104 is comprised of the following elements:

Element Management System (EMS) Server 116,
Lawful Intercept (LI) Server 118,
Web Group Provisioning (WGP) Server 122, and
Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC Services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
Create Subscriber account,
Update Subscriber account,
Delete Subscriber account,
Mobile number change command,
View Subscriber details (MDN, Group, Group members),
Manage Corporate Accounts,
Add CSR account,
Delete CSR account.

3 System Functions

The following sections describe various functions performed by each of the components of the system architecture.

3.1 PoC Service Layer 3.1.1 PoC Server

The PoC Server 112 controls PoC call sessions, including 1-1, Ad Hoc and Pre-Arranged PoC call sessions. The PoC Server 112 also controls Instant Personal Alerts.

The PoC Server 112 expects the PoC Clients 136 to setup "pre-established sessions" at the time of start up and use these sessions to make outgoing PoC calls. The PoC Server 112 also uses pre-established sessions to terminate incoming PoC calls to the PoC Clients 136. The PoC Clients 136 are setup in auto-answer mode by default. The use of pre-established sessions and auto-answer mode together allow for faster call setup for PoC call sessions.

The PoC Server 112 allocates and manages the media ports of the Media Services 114 associated with each SIP INVITE dialog for pre-established sessions and controls the Media Servers 114 to dynamically associate these ports at run time for sending RTP packets during PoC call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the PoC call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately. Based on these instructions, the Media Server 114 sends floor control messages to the PoC Clients 136 and sends the RTP packets received from the talker to all the listeners.

3.1.4 Presence Server

The Presence Server 110 accepts presence information published by PoC Clients 136, as well as availability information received from other entities. The Presence Server 110 keeps track of these presence states and sends notifications to various "watcher" applications whenever a presence state changes. The Presence Server 110 maintains a separate subscription for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.5 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.6 RV Server

The RV Server 140 performs WiFi interworking for the PoC service by communicating with the PoC Clients 136 via one or more WiFi networks 142.

The PoC Client 136 sets up one or more connections using the configured Fully Qualified Domain Name (FQDN), or absolute domain name, of the RV Server 140, which may be publicly exposed to the Internet. Secure transport protocols may (or may not) be used for the connections across the WiFi networks 142. For example, the PoC Clients 136 may use the Transport Layer Security (TLS) and/or Secure Sockets Layer (SSL) protocols for encrypting information transmitted over the connections between the PoC Client 136 and the RV Server 140.

In such an embodiment, all SIP signaling and voice data (RTP and RTCP) would be tunneled over the SSL/TLS connections between the PoC Client 136 and the RV Server 140. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the RV Server 140 performs as an encryption/decryption off-loader that provides end-to-end encryption for all traffic transmitted to and from the PoC Client 136. Specifically, all of the traffic sent to the PoC Client 136 is encrypted at the RV Server 140 and all the traffic received from the PoC Client 136 is decrypted at the RV Server 140.

The RV Server 140 terminates the SSL/TLS connections and aggregates or dis-aggregates the PoC Client 136 traffic to the appropriate Servers 108, 110, 112, 114, 116, 118, 120 and 122. Specifically, the RV Server 140 acts as an intelligent traffic distributor for SIP signaling and RTP/RTCP traffic by forwarding the traffic to the appropriate Servers 108, 110, 112, 114, 116, 118, 120 and 122, depending on the message types and the availability of the Servers 108, 110, 112, 114, 116, 118, 120 and 122. Consequently, the RV Server 140 is a single point-of-contact for all traffic to and from the PoC Clients 136 at an IP transport layer via the WiFi networks 142.

Typically, the SSL/TLS connections are persisted and used for any bidirectional data transfer between the RV Server 140, or other Servers, and the PoC Clients 136. Thus, a PoC Client 136 maintains an "always-on" connection with the RV Server 140 by periodically sending "keep-alive" messages over the SSL/TLS connections.

The system also simplifies the traversal of the Firewalls 144. Preferably, the PoC Clients 136 establish the SSL/TLS connections to the RV Server 140 over TCP port 443, which is typically used for HTTPS communications. This allows for Firewall 144 traversal on most corporate networks, because the Firewall 144 facing (exposed to) the Internet is default configured to allow (and not deny) the SSL/TLS connections on TCP port 443. As a result, the system does not require that any special changes be made to the Firewall 144, such as those changes typically required for VoIP deployments in corporate networks. Instead, the traffic with the PoC Clients 136 is routed over SSL/TLS connections on TCP port 443, which can traverse through the Firewalls 144 seamlessly.

3.2 Management Layer 3.2.1 EMS Server

The EMS Server 116 is the central management entity in the system and includes the following modules:

A central application where all management business logic resides.

A web server for serving the network operator's internal users. A corresponding client provides a user interface for viewing fault, configuration, performance and security information.

A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.

Create Subscriber account,
Update Subscriber account,
Delete Subscriber account,
Mobile number change command,
Forced synchronization of a Subscriber,
Deactivate a Subscriber account,
Reactivate a Subscriber account,
View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:

group management,
contact management, and
associations between corporations.

With regard to group management, the CAT of the WGP Server 122 includes the following operations:
- Create, Update, Delete and View Corporate Groups,
- Add, Update, Delete and View Members of a Corporate Group,
- Manage Subscribers,
- Activate and Deactivate a Corporate Subscriber,
- Change a Subscriber type from "Corporate" to "Corporate And Public", and vice versa,
- Restrict Availability, i.e., do not allow subscriber to change their presence status, and
- Manage number porting or name change via phone assignment.

With regard to contact management, the CAT of the WGP Server 122 includes the following operations:
- Phone list management,
- N×N Contact Add (e.g., N contacts may be members of N groups),
- Add, Update, Delete and View Contacts for a specific subscriber, and
- Export and Import contacts at both the subscriber and corporate level.

With regard to associations between corporations, the CAT of the WGP Server 122 includes the following operations:
- Corporate Associations Attributes,
- Association Name,
- Association ID,
- Association Mode (e.g., One-way, Two-way), and
- Restricted List.

Once the association is created and accepted, corporate administrators can create contacts and groups using the association policies. Administrators from other corporations can view the contacts, and may or may not have the capability to add, update or delete the contacts.
- Corporate ID associated per corporate subscriber,
- Central management of corporate subscribers, groups, and contacts,
- Intercorporate associations, including contacts and white lists,
- Phone list management (e.g., N×N contact add),
- Restrict Availability, and
- Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:
- PoC Calls and Instant Personal Alert,
- Presence, and
- Contact and Group Management.

The PoC Client 136 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server 110 as a "watcher" of all contacts in the handset 134 and updates the user interface of the handset 134 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the handset 134 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged PoC calls. The client module also supports sending and receiving Instant Personal Alerts (IPA).

3.4 Presence Management

3.4.1 Presence Robustness

When a PoC Client 136 is in a poor data coverage area, there are several cases where the user appears to be online to all his/her watchers, but the user frequently experiences call failures or voice quality issues when a PoC call is attempted. The "presence robustness" enhancements of the present invention attempt to solve these issues by proactively monitoring network conditions, with both servers and clients participating in the detection of such conditions.

Typically, a user or subscriber is either online or offline. To track the user under inconsistent network conditions, the present invention introduces a new internal presence state called "Temporary Unreachable" (TU), indicating that the user or subscriber is neither online or offline, but is temporarily unreachable or unavailable. However, watchers do not see the new presence status; instead, watchers see a user as "offline" when the user is in the TU state. When the user recovers from the TU state, watchers see the user as "online."

Thus, the present invention detects service users in an insufficient wireless radio coverage network and improves the service delivery experience by guaranteed presence, e.g., a user's presence is indicated as being truly "online," when not explicitly "offline" or implicitly "offline" because the user is "temporarily unreachable or unavailable."

3.4.2 Client Based TU State Detection

A PoC Client 136 monitors the underlying network passively listening for network connectivity events from the handset 134. Specifically, the user's mobile unit detects that the user is temporarily unreachable or unavailable. Network connectivity events include both loss and recovery of connectivity. The PoC Client 136 uses this information to update the user interface (UI) of the handset 134 to allow or block user actions.

When a PoC Client 136 logs in, and its presence status is published as online, all watchers see the user as online and will be able to make PoC calls to the user. Subsequently, when the data connection is lost, the watchers continue to see the user as online, but any call attempt will fail. The false presence state information results in poor user experiences.

To resolve this, a PoC Client 136 sends an SMS to the Presence Server 110 to publish its TU status, wherein the Presence Server 110 notifies all watchers of the user's offline state. For example, the PoC Client 136 may detect that the signal-to-noise ratio (SNR) of an available data channel is below the threshold for accessing the service and then uses an SMS channel to notify one or more of the servers of the unavailability condition of the data channel.

When the data connection is restored and remains stable for a configured duration, the PoC Client 136 sends a Presence Publish message to the Presence Server 110 to publish its online status, wherein the Presence Server 110 notifies all watchers of the user's online state, thus restoring service to the subscriber.

In order to avoid a flood of messages under poor data network coverage conditions, where the data connection is frequently lost and then recovered, the PoC Client 136 implements various timers. These timers determine how long the data network must remain connected after recovery, after which the PoC Client 136 announces its online status. The figure described below provides a high level overview of these mechanism.

Figure 2:
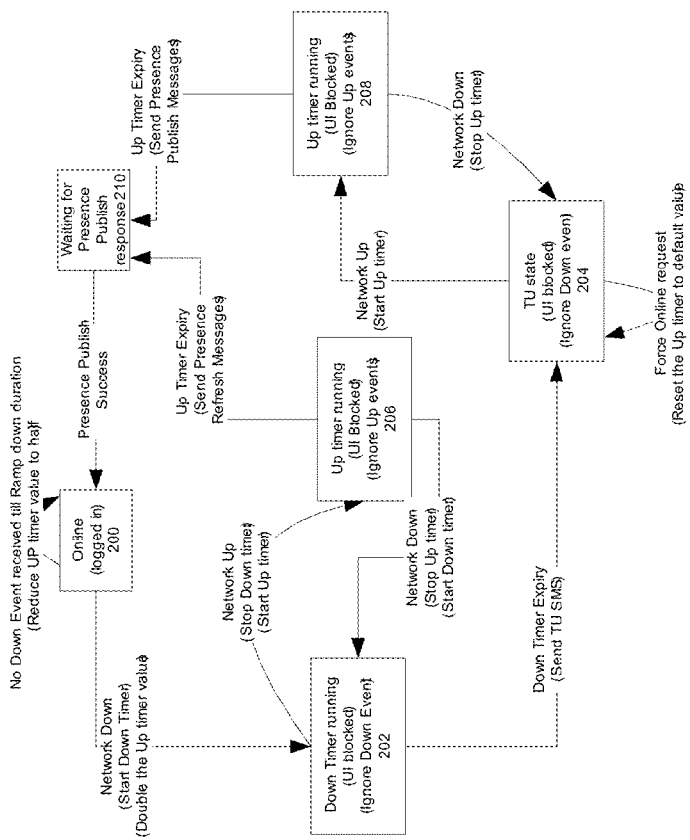
FIGS. 2-13 illustrate state diagrams, state machines, and call flows for various scenarios according to the preferred embodiment of the present invention.

FIG. 2 is a client state diagram for a subscriber's presence status.

The logic in FIG. 2 starts with the PoC Client 136 being logged in, which is indicated as being in an "Online" state 200.

While in the Online state 200, if no Down Events are received until a ramp-down duration expires, then the Up Timer is reduced by half, and the state of the PoC Client 136 remains in the "Online" state 200. If a Network Down event occurs, then the Down Timer is started, the Up Timer is doubled, and the state of the PoC Client 136 transitions to the "Down Timer Running" state 202.

While in the "Down Timer Running" state 202, the UI is blocked and Down Events are ignored. If a Down Timer expiry occurs, then a TU SMS is sent, and the state of the PoC Client 136 transitions to the "TU" state 204. If a Network Up event occurs, then the Down Timer is stopped, the Up Timer is started, and the state of the PoC Client 136 transitions to the "Up Timer Running" state 206.

While in the "TU" state 204, the UI is blocked and Down Events are ignored. If a Force Online request occurs, then the Up Timer is reset to a default value, and the state of the PoC Client 136 remains in the "TU" state 204. If a Network Up event occurs, then the Up Timer is started, and the state of the PoC Client 136 transitions to the "Up Timer Running" state 208.

While in the "Up Timer Running" state 206, the UI is blocked and Up Events are ignored. If an Up Timer expiry occurs, then a Presence Refresh message is sent, and the state of the PoC Client 136 transitions to the "Waiting for Presence Publish response" state 210. If a Network Down event occurs, then the Up Timer is stopped, the Down Timer is started, and the state of the PoC Client 136 transitions to the "Down Timer Running" state 202.

While in the "Up Timer Running" state 208, the UI is blocked and Up Events are ignored. If a Network Down event occurs, then the Up Timer is stopped, and the state of the PoC Client 136 transitions to the "TU" state 204. If an Up Timer expiry occurs, then a Presence Publish message is sent, and the state of the PoC Client 136 transitions to the "Waiting for Presence Publish response" state 210.

While in the "Waiting for Presence Publish response" state 210, if a Presence Publish message is transmitted successfully, then the state of the PoC Client 136 transitions to the "Online" state 200.

Note that all timers mentioned in above diagram, i.e., the expiry timers, are configurable, so that they can be tuned as required.

3.4.3 Server Based TU State Detection 3.4.3.1 TU State Detection Logic

When the PoC Server 112 attempts to send an incoming call or IPA indication, or the Presence Server 110 attempts to send a presence notification, to the PoC Client 136, and it could not be delivered, then the Presence Server 110 does not immediately mark the user's presence state as TU. Instead, it enters the "TU detection" phase where it attempts to send a SIP Message request to the PoC Client 136 for a configured number of times at configured intervals. This includes the normal SIP stack retransmission for UDP transport and SIP transaction timeout for all transports. The number of attempts and intervals are chosen such that the TU detection mechanism is in the order of a few minutes. This allows the PoC Clients 136 to recover automatically from any transient network conditions that triggered TU detection. If the Presence Server 110 receives a SIP response from the PoC Client 136 for any of these requests, then it cancels the TU detection mechanism and leaves the user's presence status unchanged.

If all TU detection attempts fail, i.e., no response is received for any of the TU detection SIP Message requests, then the Presence Server 110 marks the presence status of the user as TU. This causes the Presence Server 110 to notify all of the user's watchers that the user's status is offline.

In addition to this, the Presence Server 110 also marks the user as TU when it receives a TU SMS, i.e., the equivalent of a Presence Publish message for the TU state, that the PoC Client 136 sends over SMS.

The following state diagram summarizes the TU detection and recovery mechanisms.

Figure 3:
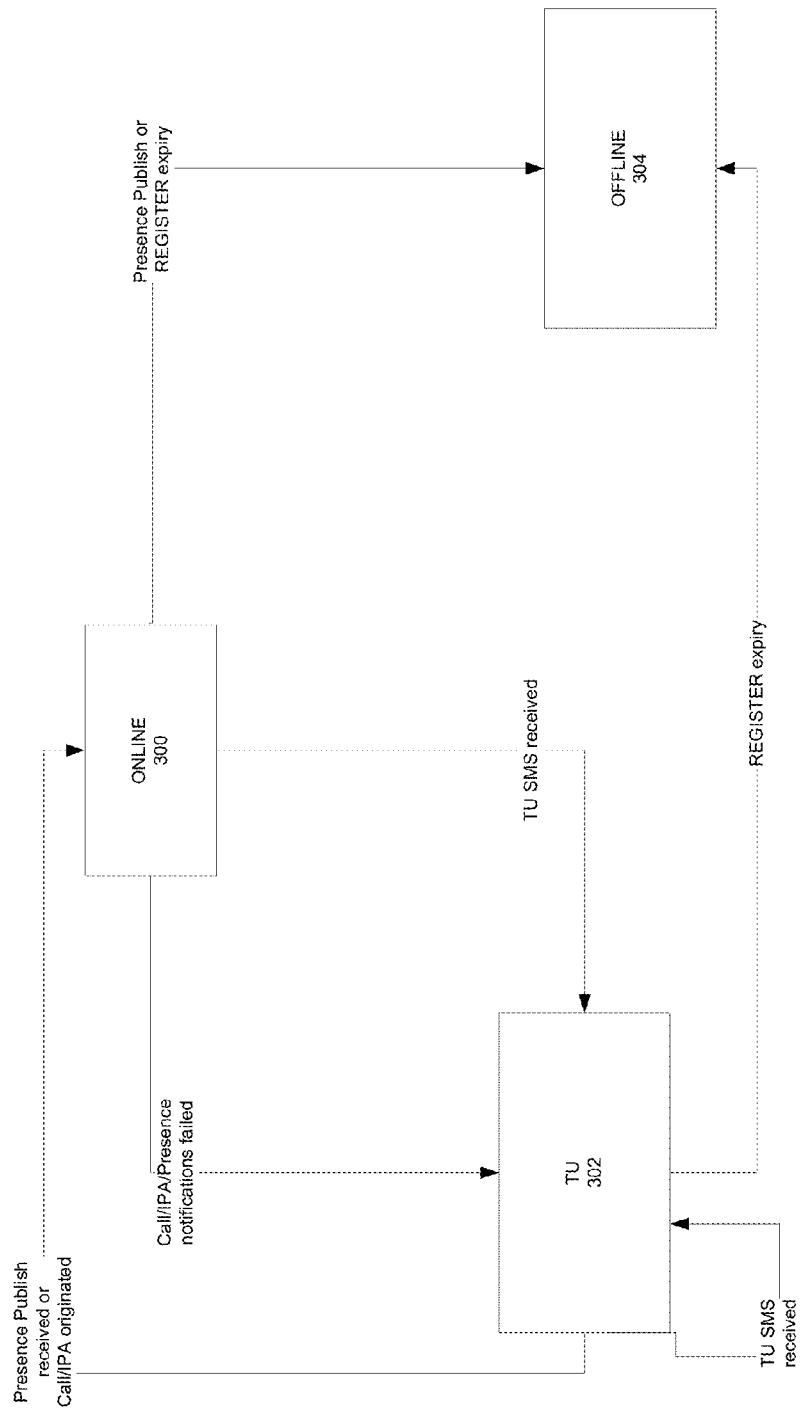

FIG. 3 is a server state diagram for a user's presence status.

The logic in FIG. 3 starts with a PoC Client 136 state being indicated as an "Online" state 300 as a result of the Presence Server 110 having received a Presence Publish, or the PoC Server 112 having received a call or IPA message, initiated by the PoC Client 136. In the Online state 300, the PoC Server 112 can send incoming calls and IPA messages to the PoC Client 136, and the Presence Server 110 can send presence notifications to the PoC Client 136.

While in the Online state 300, if the call, IPA or Presence Publish fail, or if a TU SMS is received, the Presence Server 110 transitions the state of the PoC Client 136 to the "TU" state 302. Alternatively, if the PoC Client 136 sends a de-REGISTER message, or a Presence Publish expiry or a Register expiry occurs, the Presence Server 110 transitions the state of the PoC Client 136 to the "Offline" state 304.

While in the TU state 302, if a Presence Publish message is received by the Presence Server 110, or a call or IPA is received by the PoC Server 112, from the PoC Client 136, the Presence Server 110 transitions the state of the PoC Client 136 to the Online state 300. Alternatively, if a TU SMS is received, the PoC Client 136 remains in the TU state 302. Alternatively, if a Register expiry occurs, the PoC Client 136 transitions to the Offline state 304.

Finally, the PoC Client 136 remains in the Offline state 304. The logic re-starts with a Presence Publish message being received from the Presence Server 110, or a call or IPA being initiated by the PoC Client 136, at which time the PoC Client 136 is indicated as being in the Online state 300.

3.4.3.2 Recovery from TU State

When a user is marked as TU, after all TU detection attempts have failed due to a timeout, the Presence Server 110 enters the "TU recovery" phase. During this phase, the Presence Server 110 continues to attempt delivery of SIP Message requests to the PoC Client 136. This is similar to the TU detection phase and the SIP Message format is identical. The only difference is in the number of attempts and the interval between attempts. Typically, the interval between each TU recovery attempt is of the order of minutes, so that the overall TU recovery phase is much longer than the detection phase. The Presence Server 110 also has a configurable parameter that determines the number of consecutive successful TU recovery attempts before the user is marked as online When all TU recovery attempts have failed due to timeout, the Presence Server 110 stops the recovery procedure and the user remains in the TU state. The TU recovery mechanism does not apply when a user is marked as TU due to receipt of TU SMS from PoC Client 136.

A subscriber who is marked as TU due to any of the above reasons is subsequently marked as online when any of the following events occur:
- the PoC Client 136 sends a Presence Publish message,
- the PoC Client 136 attempts an outgoing PoC call (e.g., a SIP Refer is received),
- the PoC Client 136 attempts an outgoing IPA (e.g., a SIP Message is received),
- a configured number of consecutive successful TU recovery attempts have been made.

Figure 4:
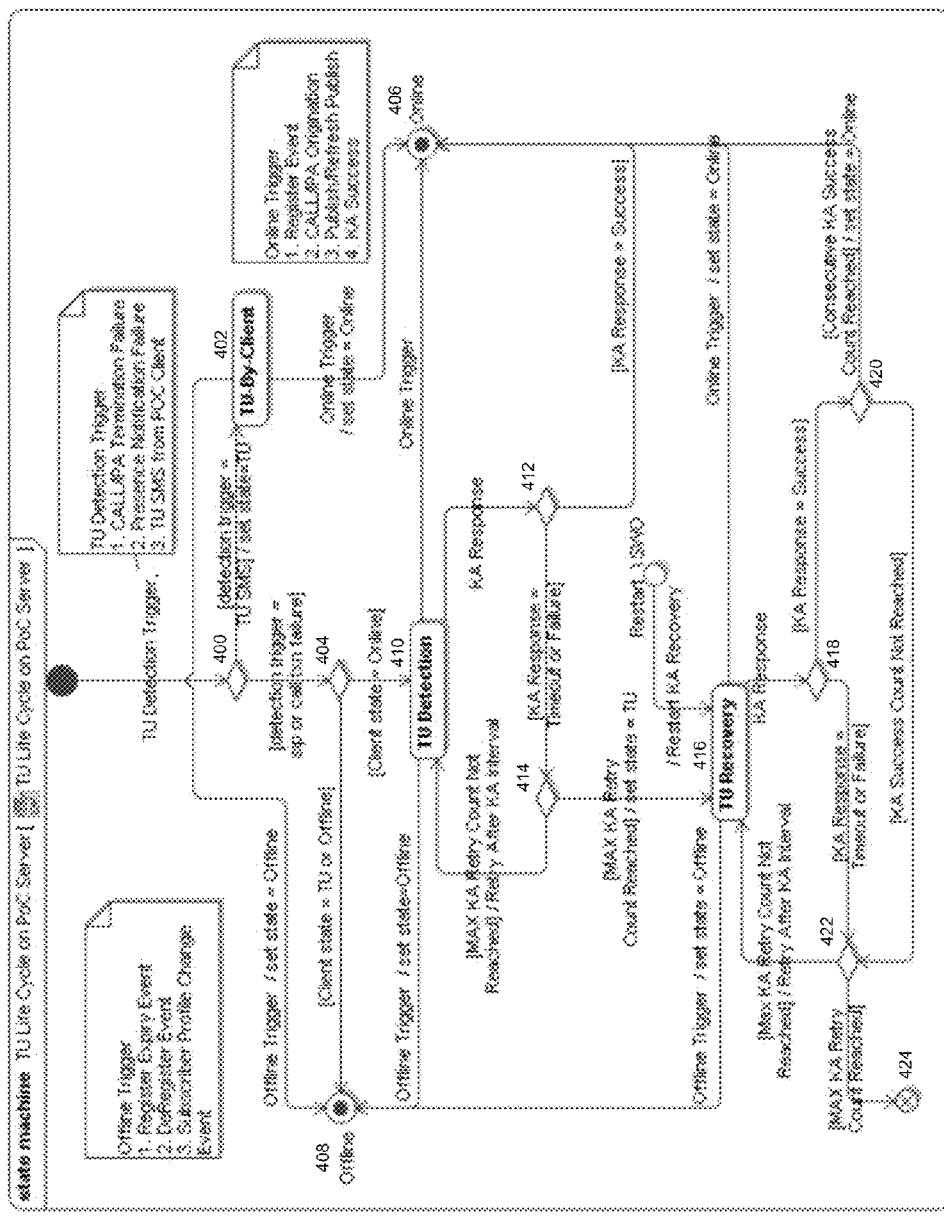

FIG. 4 illustrates the "Temporary Unreachable" state detection and recovery logic in the PoC Server 112.

The TU life cycle on the PoC Server 112 begins with a TU detection trigger. The TU detection trigger may comprise: a call or IPA termination failure; a presence notification failure; or the receipt of a TU SMS from a PoC Client 136.

Block 400 is a decision block that determines whether the TU detection trigger resulted from a TU SMS from a PoC Client 136. If so, control transfers to Block 402; otherwise, control transfers to Block 404.

Block 402 represents the state of TU-By-Client. Upon receipt of an online trigger, comprising a Register event, a call or IPA origination, a Publish or Refresh Publish request, or a KA response that is a success indication, the user is marked as being in an online state 406. Upon receipt of an offline trigger, comprising a Register expiry event, a De-register event, or a Subscriber Profile Change event, the user is marked as being in an offline state 408.

Block 404 is a decision block that determines whether the PoC Client 136 is in an online state when TU detection is triggered by a call or IPA timeout, or a presence notification timeout. If so, control transfers to Block 410; otherwise, the TU detection trigger is ignored as the user is in the offline or a TU state already.

Block 410 represents the state of TU Detection. On entering the TU Detection state, the Presence Server 110 sends a KA message to the PoC Client 136. Upon receipt of an online trigger, the user is marked as being in the online state 406. Upon receipt of an offline trigger, the user is marked as being in the offline state 408. Upon receipt of a KA response, control transfers to Block 412.

Block 412 is a decision block that determines whether the KA response is a success indicator. If so, control transfers to Block 406, wherein the user is marked as being in the online state 406; otherwise, control transfers to Block 414.

Block 414 is a decision block that determines whether the maximum KA retry count has been reached. If so, control transfers to Block 410, after the KA interval; otherwise, control transfers to Block 416.

Block 416 represents the state of TU Recovery, which may also be initiated by a restart of the KA recovery procedure on startup of the Presence Server 110. Upon receipt of an online trigger, the user is marked as being in the online state 406. Upon receipt of an offline trigger, the user is marked as being in the offline state 408. Upon receipt of a KA response, control transfers to Block 418.

Block 418 is a decision block that determines whether the KA response is a success indicator. If so, control transfers to Block 420; otherwise, control transfers to Block 422.

Block 420 is a decision block that determines whether the consecutive KA success count has been reached. If so, control transfers to Block 406 and the user is marked as being in the online state 406; otherwise, control transfers to Block 422.

Block 422 is a decision block that determines whether the maximum KA retry count has been reached. If so, control transfers to Block 424, which terminates the logic and the user remains in the TU state; otherwise, control transfers to Block 416.

3.4.4 Call Flow Diagrams

To reduce presence mismatch due to network connectivity or other issues, clients and servers support detecting potential mismatches and marking users as TU and notifying watchers with user's presence status as offline. FIGS. 5-13 are call flow diagrams illustrating the messaging sequences of the different scenarios for marking a user as TU as well as recovering from this state (back to an online state).

Figure 5:
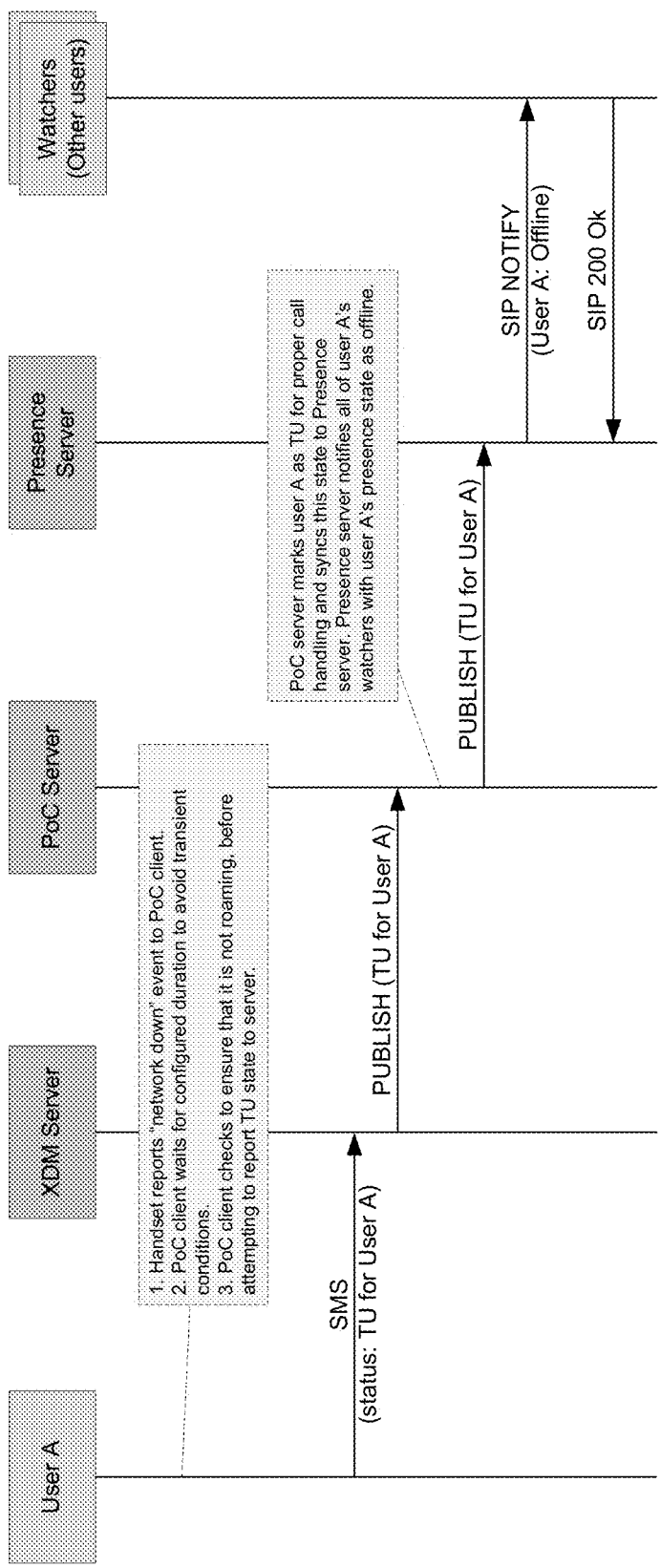

3.4.4.1 Client Based TU Status Detection and Recovery 3.4.4.1.1 Call Flow—Client Reporting (Publishing) TU Status to Server FIG. 5 is a call flow showing how the PoC Client 136 reports a TU status to various servers.

Initially, the handset 134 reports a "network down" event to the PoC Client 136 for user A. The PoC Client 136 waits for a configured duration to avoid any transient conditions for the network connection. The PoC Client 136 also checks to ensure that it is not roaming, before attempting to report its TU state to the various servers.

The PoC Client 136 sends an SMS, with the TU status, to the XDM Server 108.

The XDM Server 108 sends a Publish message, indicating a TU state for user A, to the PoC Server 112.

The PoC Server 112 marks user A as being in the TU state for proper call handling and synchronizes this state to the Presence Server 110 by sending a Publish message, indicating a TU state for user A, to the Presence Server 110.

The Presence Server 110 notifies all of the watchers for user A that user A has a presence state of "offline" by means of SIP Notify messages. Each of the watchers acknowledge this message with a SIP 200 OK reply.

3.4.4.1.2 Call Flow—Client Recovering from TU Status

Figure 6:
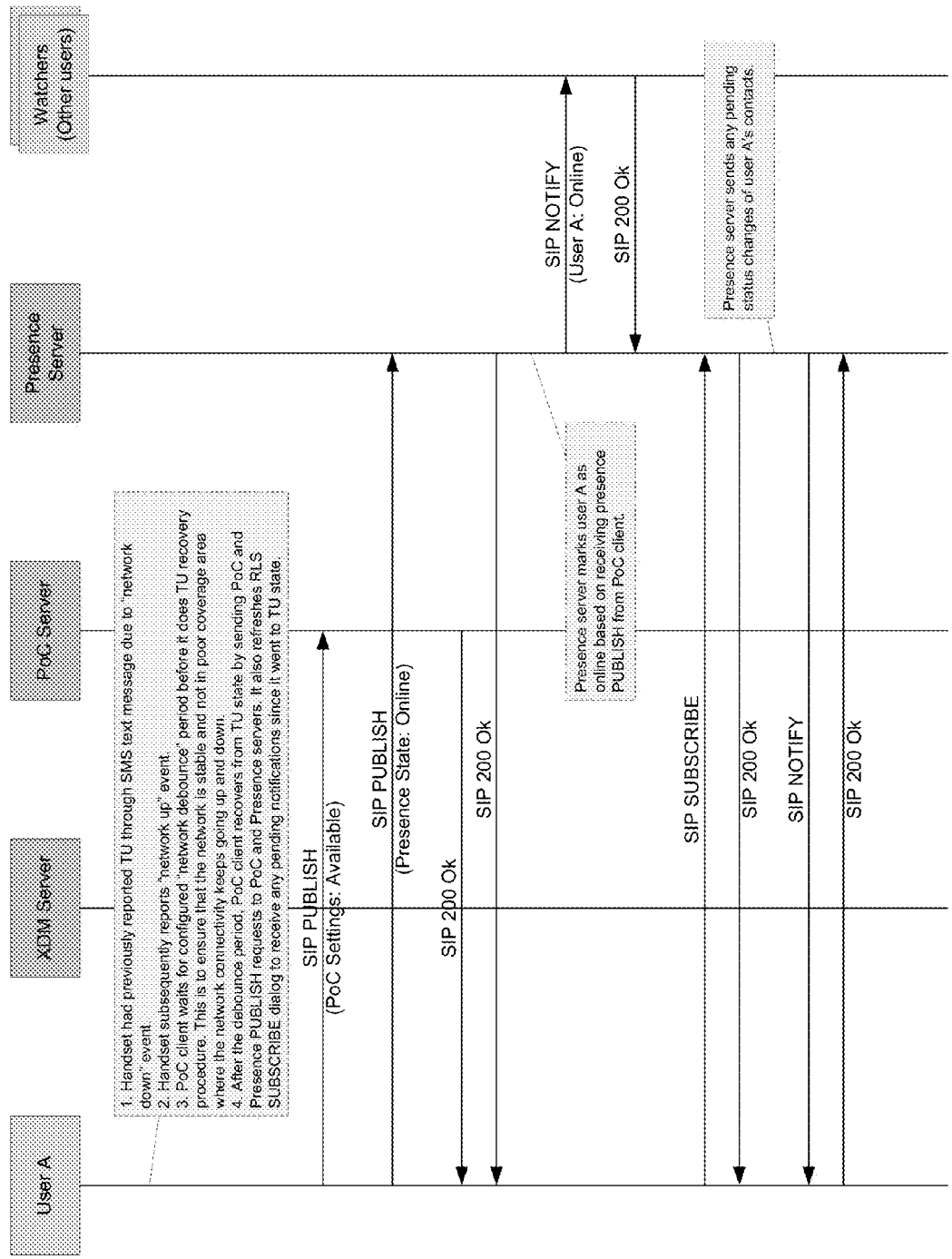

FIG. 6 is a call flow showing how the PoC Client 136 recovers from a TU state.

The handset 134, which previously reported a "network down" event to the PoC Client 136, subsequently reports a "network up" event to the PoC Client 136. The PoC Client 136 waits for a configured "network debounce" period before it commences the TU recovery procedure to avoid any transient conditions for the network connection. This ensures that the network is stable and the handset 134 is not in a poor coverage area, where network connectivity keeps going up and down. After the network debounce period, the PoC Client 136 recovers from the TU state by sending Publish messages to the servers, and by refreshing a Subscribe dialog to receive any pending notifications since it went into the TU state.

The PoC Client 136 sends a SIP Publish message, with the PoC settings "Available," to the PoC Server 112. The PoC Client 136 also sends a SIP Publish message, with a presence state of "online," to the Presence Server 110. Both servers acknowledge these messages with a SIP 200 OK reply.

The Presence Server 110 marks user A as being online, and notifies all of the watchers for user A that user A has a presence state of "online" by means of SIP Notify messages. Each of the watchers acknowledge this message with a SIP 200 OK reply.

The PoC Client 136 sends a SIP Subscribe message to the Presence Server 110, which is acknowledged with a SIP 200 OK reply. The Presence Server 110 then sends a pending status change for user A to all watchers by means of SIP Notify messages, which are acknowledged with a SIP 200 OK reply.

3.4.4.1.3 Call Flow—Client Recovering from TU Status Using Presence Publish

Figure 7:
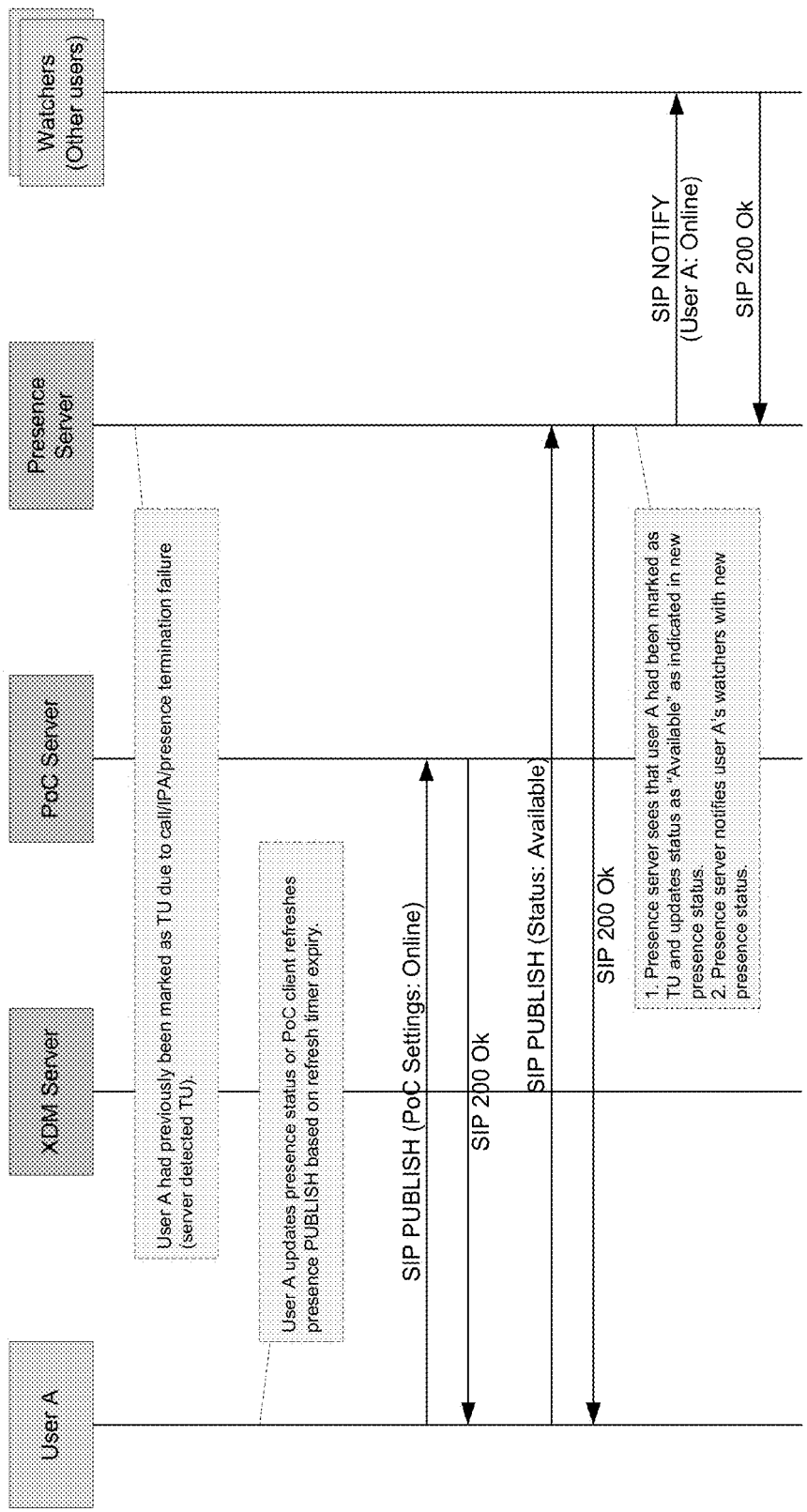

FIG. 7 is a call flow showing how the PoC Client 136 recovers from a TU status because of a periodic Presence Publish message.

In this scenario, the PoC Client 136 for user A had previously been marked as TU, due to a call, IPA, or Presence Publish termination failure, i.e., a server detected the TU status. Subsequently, user A updates their presence status, or the PoC Client 136 refreshes its Presence Publish message, based on the expiry of a refresh timer.

The PoC Client 136 sends a SIP Publish message, with the PoC settings "online," to the PoC Server 112. The PoC Client 136 also sends a SIP Publish message, with a presence state of "available," to the Presence Server 110. Both servers acknowledge these messages with a SIP 200 OK reply.

The Presence Server 110 marks user A as being available, and notifies all of the watchers for user A that user A has a new presence state of "online" by means of SIP Notify messages. Each of the watchers acknowledge this message with a SIP 200 OK reply.

Figure 8:
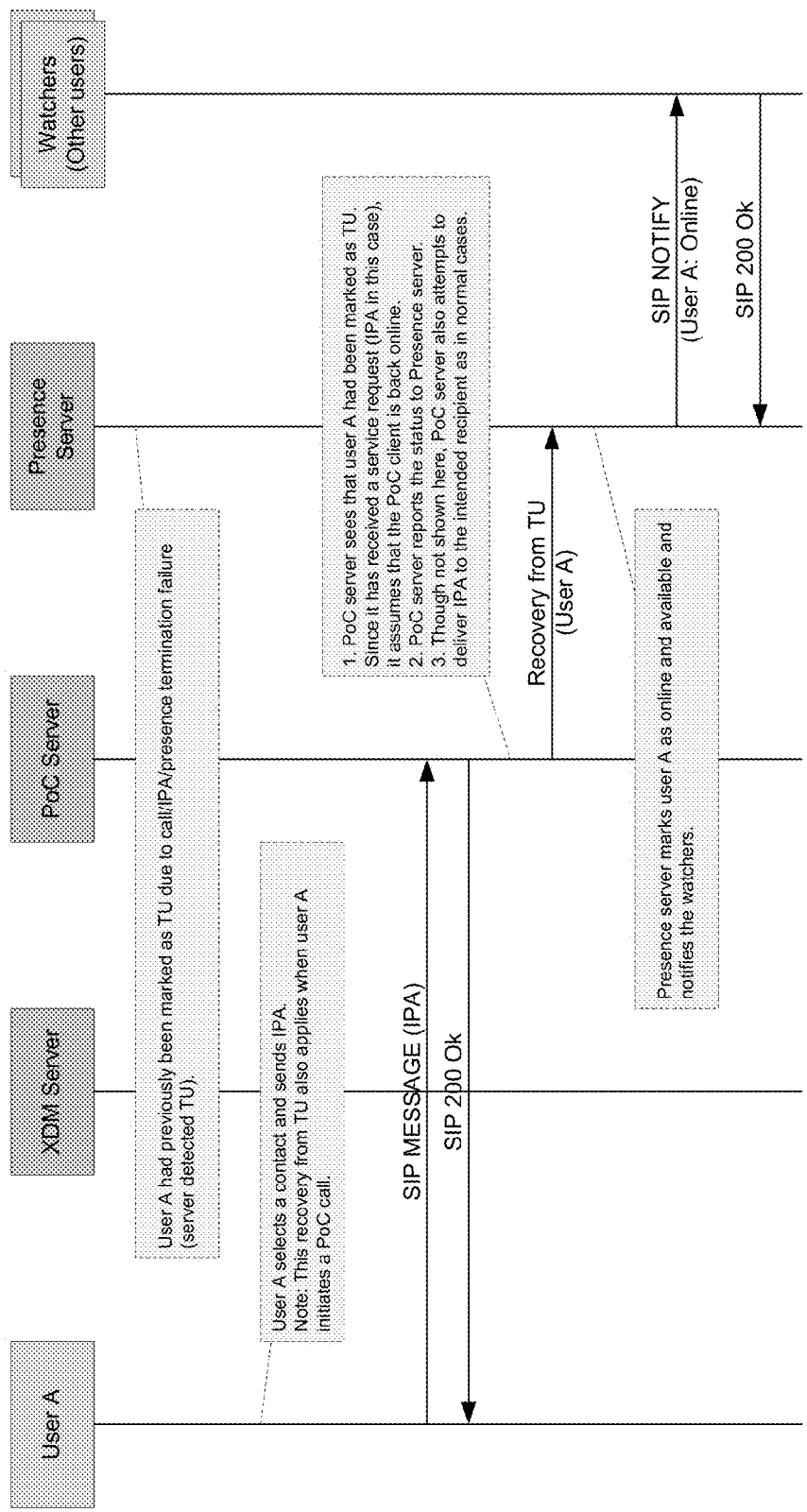

3.4.4.1.4 Call Flow—Client Recovering from TU Status Using Call or IPA Originations FIG. 8 is a call flow showing how the PoC Client 136 recovers from a TU status because of a call or IPA origination.

In this scenario, the PoC Client 136 for user A had previously been marked as TU, due to a call, IPA, or Presence Publish termination failure, i.e., a server detected the TU status. Subsequently, user A selects a contact and initiates a call or IPA using the PoC Client 136.

The PoC Client 136 sends a SIP message, e.g., a call or IPA origination, to the PoC Server 112. The PoC Server 112 acknowledges the message with a SIP 200 OK reply.

The PoC Server 112 sees that user A has been marked TU. However, because it has now received a call or IPA origination from the PoC Client 136 of user A, it assumes that the PoC Client 136 of user A is back online. The PoC Server 112 reports the recovery from TU for user A to the Presence Server 110. Although not shown, the PoC Server 112 also attempts to deliver the call or IPA origination to the intended recipient in the normal manner.

The Presence Server 110 marks user A as being online and available, and notifies all of the watchers for user A that user A has a new presence state of "online" by means of SIP Notify messages. Each of the watchers acknowledge this message with a SIP 200 OK reply.

3.4.4.2 Server Based TU Status Detection

3.4.4.2.1 Call Flow—Server Detected TU Status—Call Termination Failure

Figure 9:
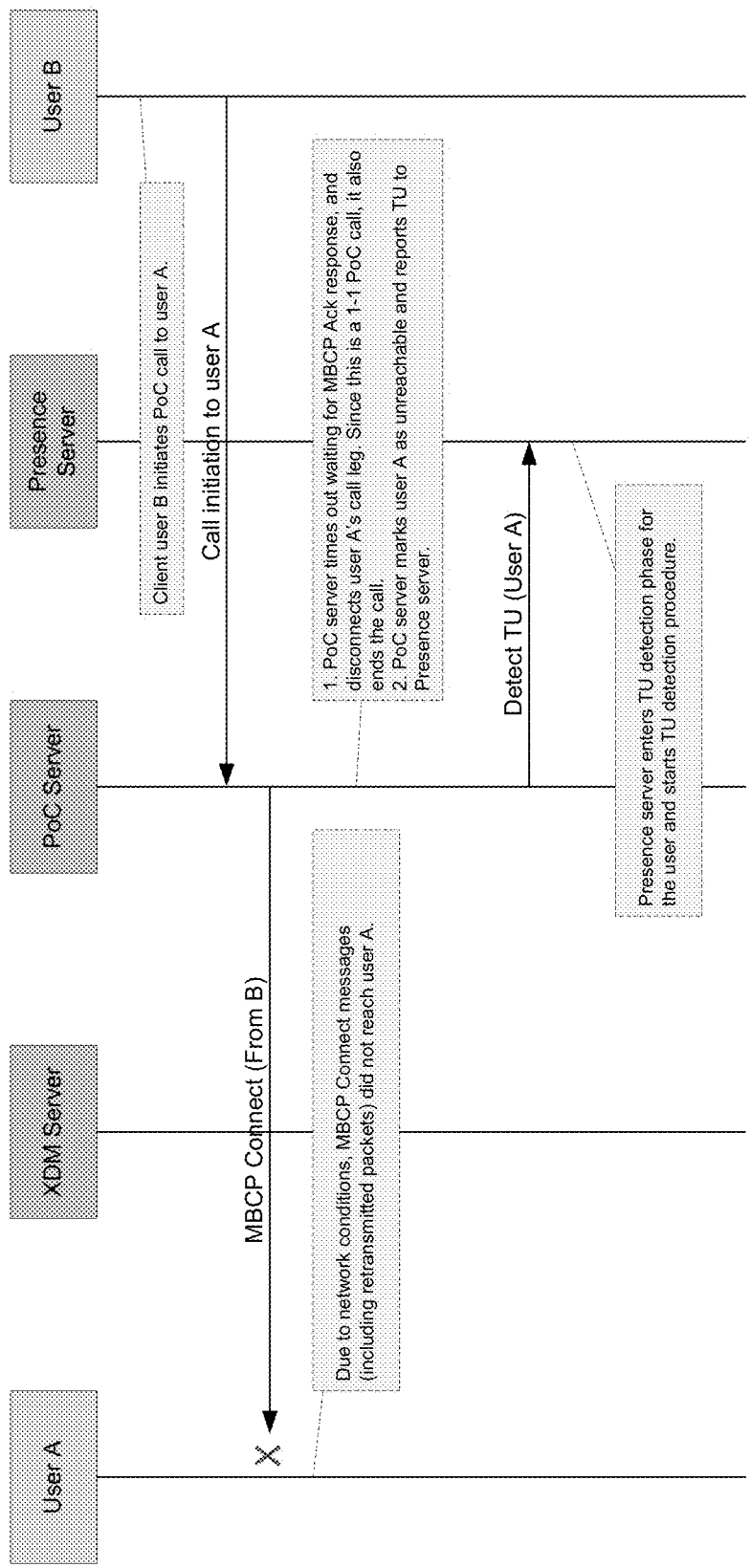

FIG. 9 is a call flow showing how the PoC Server 112 detects the TU status of a user because of a call termination failure.

In this scenario, the PoC Client 136 for user B initiates a PoC Call to user A. The PoC Client 136 for user B sends a call initiation message to the PoC Server 112.

In response, the PoC Server 112 sends an MBCP Connect message to the PoC Client 136 for user A. However, due to network conditions, the MBCP Connect message (including retransmitted packets) does not reach the PoC Client 136 for user A.

The PoC Server 112 times out waiting for an acknowledgement to the MBCP Connect message, and disconnects the call leg to user A. Since this is a 1-1 PoC call, it also ends the call.

The PoC Server 112 marks user A as unreachable and reports user A as TU via a Detect TU message to the Presence Server 110.

The Presence Server 110 enters the TU detection state for user A, and starts the TU detection procedures.

3.4.4.2.2 Call Flow—Server Detected TU Status—IPA Termination Failure

Figure 10:
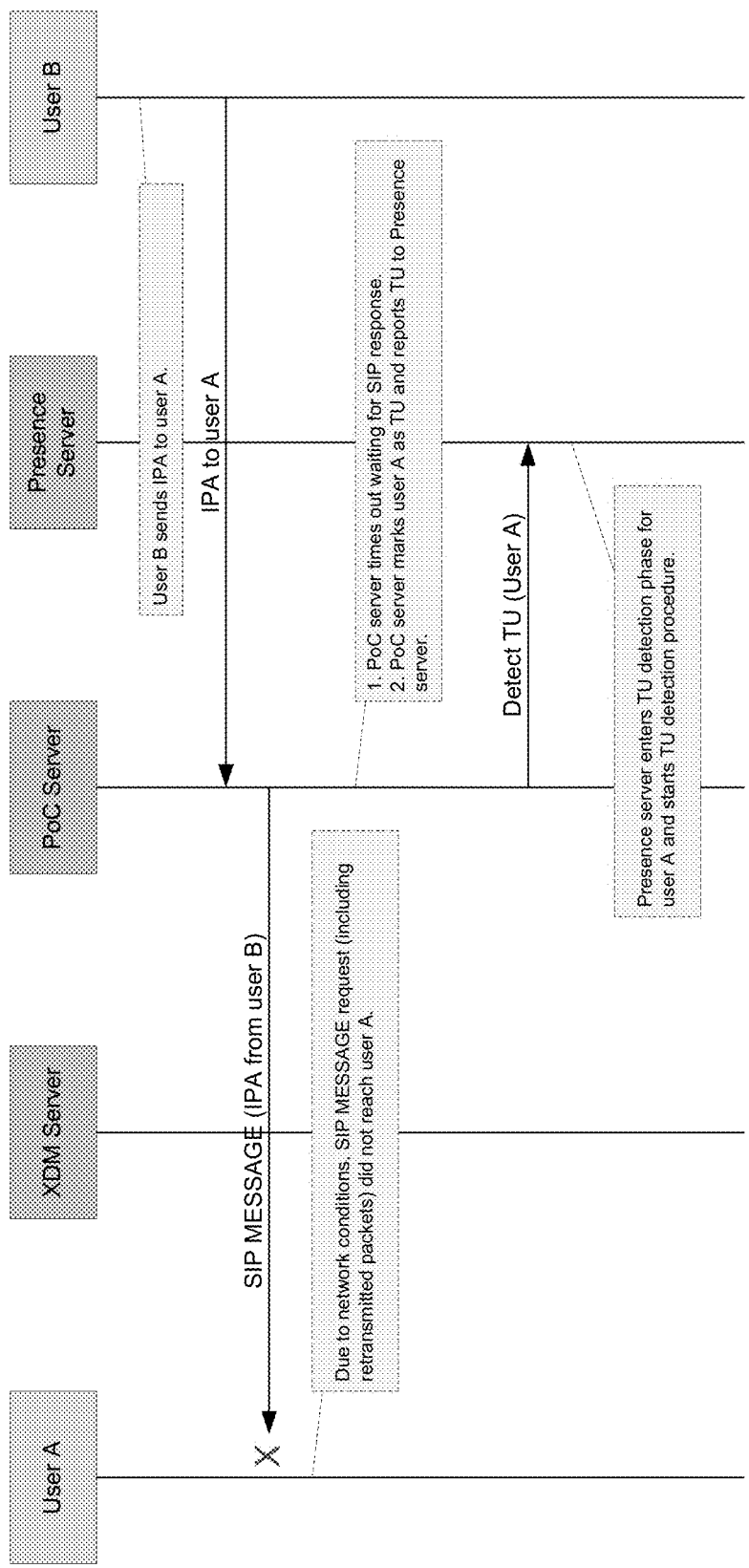

FIG. 10 is a call flow showing how the PoC Server 112 detects the TU status of a user because of an IPA termination failure.

In this scenario, the PoC Client 136 for user B initiates an IPA to user A. The PoC Client 136 for user B sends an IPA message to the PoC Server 112.

In response, the PoC Server 112 sends a SIP message to the PoC Client 136 for user A. However, due to network conditions, the SIP message (including retransmitted packets) does not reach the PoC Client 136 for user A.

The PoC Server 112 times out waiting for an acknowledgement to the SIP message, marks user A as unreachable, and reports user A as TU via a Detect TU message to the Presence Server 110.

The Presence Server 110 enters the TU detection state for user A, and starts the TU detection procedures.

Figure 11:
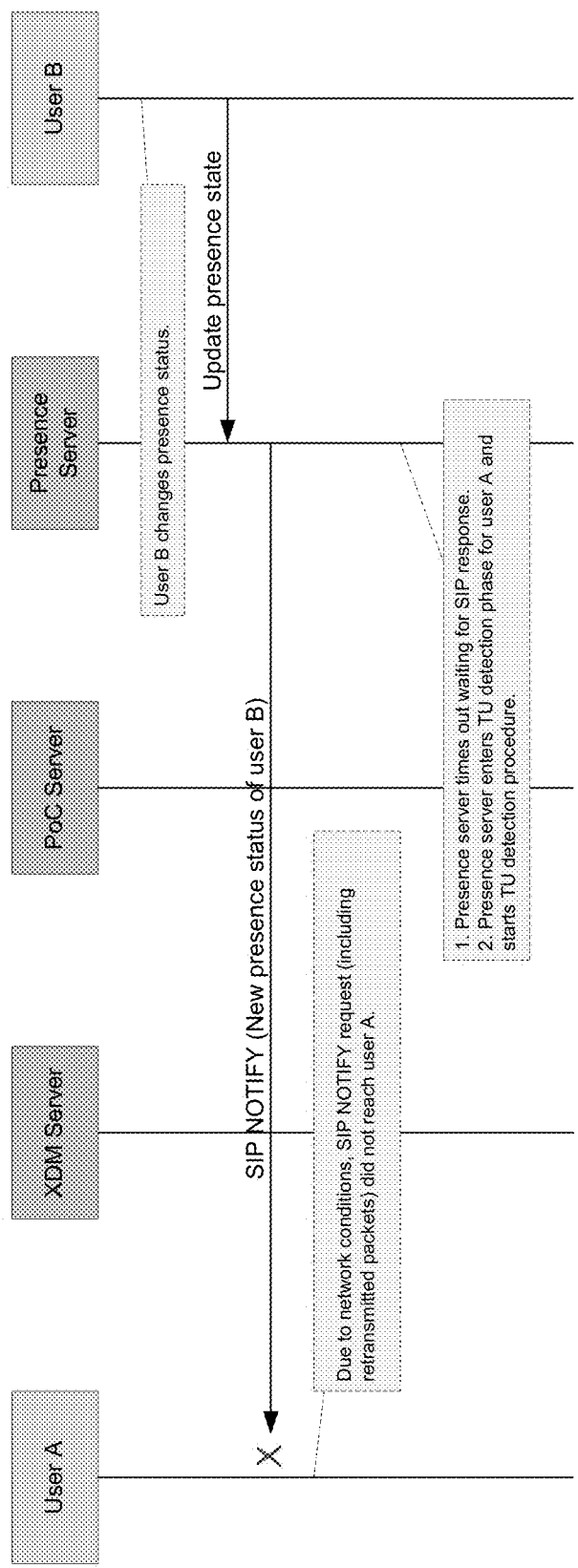

3.4.4.2.3 Call Flow—Server Detected TU Status—Presence Notification Failure FIG. 11 is a call flow showing how the Presence Server 110 detects the TU status of a user because of a presence notification failure.

In this scenario, the PoC Client 136 for user B changes its presence status, and sends an updated presence status to the Presence Server 110.

In response, the Presence Server 110 sends a SIP Notify message to the PoC Client 136 for user A, with the new presence status of user B. However, due to network conditions, the SIP Notify message (including retransmitted packets) does not reach the PoC Client 136 for user A.

The Presence Server 110 times out waiting for an acknowledgement to the SIP Notify message, enters the TU detection state for user A, and starts the TU detection procedures.

Figure 12:
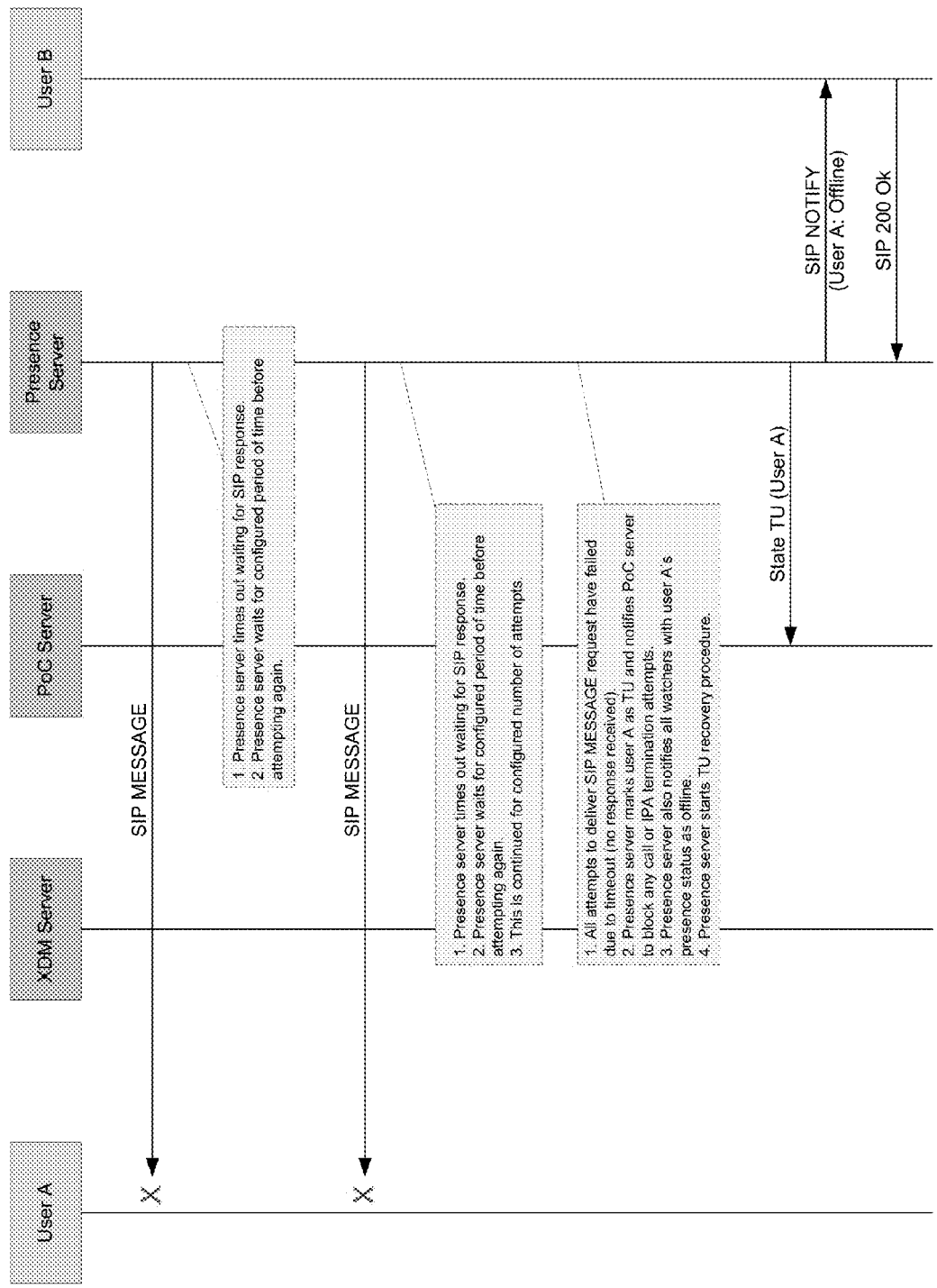

3.4.4.2.4 Call Flow—Server TU Detection Reconfirmation Method Using Polling FIG. 12 is a call flow showing how the Presence Server 110 reconfirms the TU status of a user using a polling method.

In this scenario, the Presence Server 110 sends a SIP message to the PoC Client 136 for user A. However, due to network conditions, the SIP message (including retransmitted packets) does not reach the PoC Client 136 for user A.

The Presence Server 110 times out waiting for an acknowledgement to the SIP message. The Presence Server 110 then waits for a configured period of time before attempting the SIP message again.

The Presence Server 110 again times out waiting for an acknowledgement to the SIP message, and again waits for a configured period of time before attempting the SIP message again. This is repeated for a configured number of attempts.

After all attempts to deliver the SIP message have failed due to timeouts, and no response has been received, the Presence Server 110 marks user A as TU, and notifies the PoC Server 112 to block any call or IPA termination attempts to user A.

The Presence Server 110 also notifies all of the watchers for user A that user A has a new presence state of "offline" by means of SIP Notify messages. Each of the watchers acknowledge this message with a SIP 200 OK reply.

Finally, the Presence Server 110 starts the TU recovery procedures.

3.4.4.3 Server Based Recovery from TU Status

Figure 13:
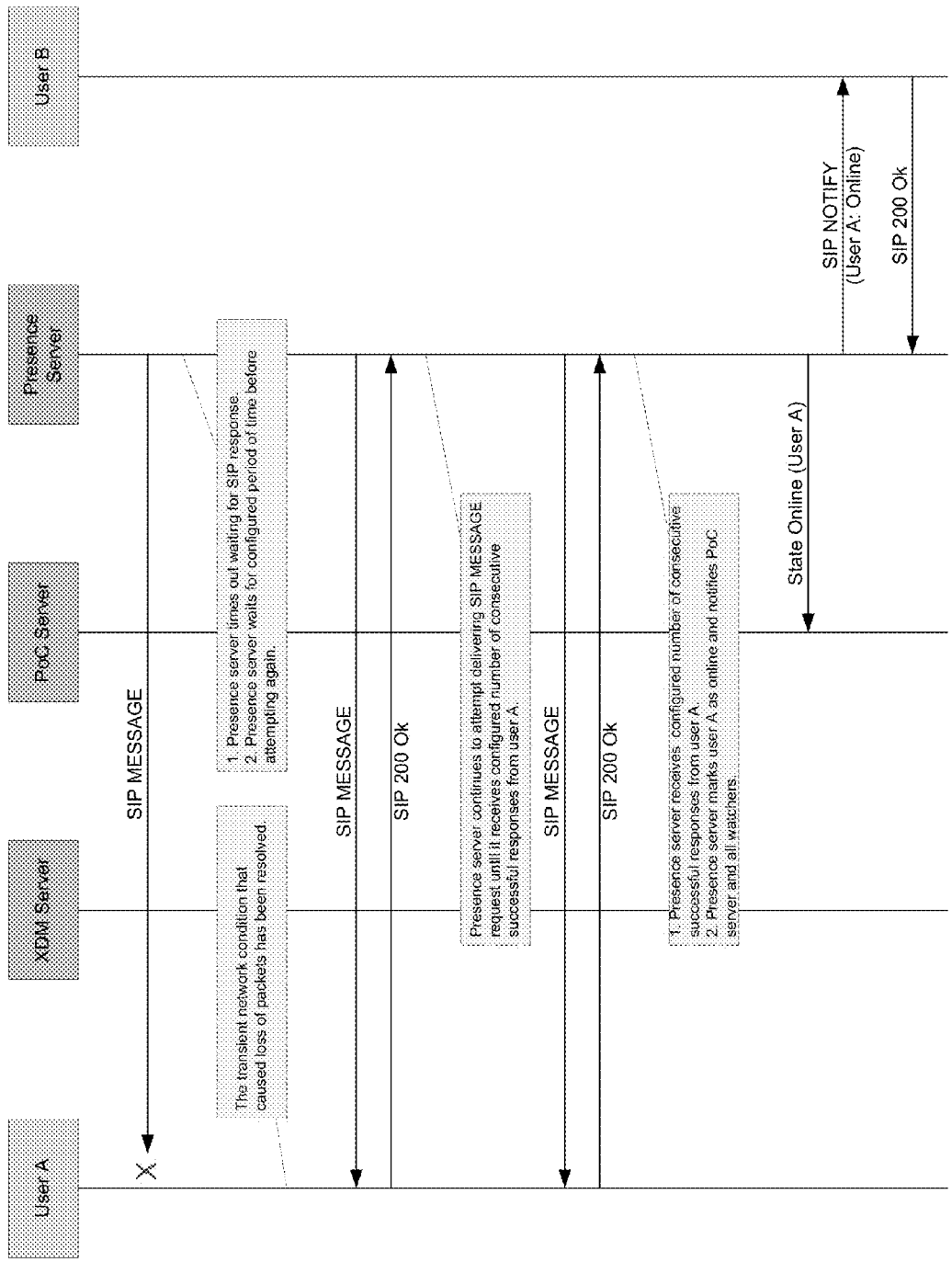

3.4.4.3.1 Call Flow—Temporary Unreachable User Status Recovered By Server Based Polling FIG. 13 is a call flow showing how the Presence Server 110 recovers from the TU status of a user using a polling method.

In this scenario, the Presence Server 110 sends a SIP message to the PoC Client 136 for user A. However, the SIP message (including retransmitted packets) does not reach the PoC Client 136 for user A.

The Presence Server 110 times out waiting for an acknowledgement to the SIP message. The Presence Server 110 then waits for a configured period of time before attempting the SIP message again.

The Presence Server 110 again sends a SIP message to the PoC Client 136 for user A. Once the transient network conditions that cause a loss of packets has been resolved, the SIP message is delivered to the PoC Client 136 for user A. The PoC Client 136 for user A acknowledges this SIP message with a SIP 200 OK reply.

The Presence Server 110 continues to attempt delivering SIP messages to the PoC Client 136 until it receives a configured number of consecutive acknowledgements from the PoC Client 136. The Presence Server 110 then marks user A as "online," and notifies the PoC Server 112 with the state of user A.

The Presence Server 110 also notifies all of the watchers for user A that user A has a new presence state of "online" by means of SIP Notify messages. Each of the watchers acknowledge this message with a SIP 200 OK reply.

Conclusion

In conclusion, the present invention relates to implementing a set of methods or algorithms implemented in system hardware and mobile devices to detect and announce the availability or reachability condition of a service user using a data channel in a cellular wireless network and thereafter notifying other watchers of the service user's presence, in order to improve the experience of service usage and delivery amongst the users. However, radio signal coverage of cellular wireless networks is not uniform across all geographies and hence it is possible that a mobile user of an application server can enter into an area where sufficient radio coverage for accessing data services does not exist or the coverage is not stable to access the application service. The present invention identifies various efficient methods and techniques, whereby other system users are made aware of the temporary unavailability or reachability condition of the service user in the network as fast as possible, while avoiding frequent flip-flops of the availability states of the user because of unstable radio coverage. This enables other service users of the system to invoke services that require guaranteed availability of minimum radio signal strength at the user end and ensures predictable quality of service delivery in loss-prone cellular network (poor signal to noise ratio).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing advanced voice services in one or more wireless communications networks, comprising:
    one or more servers that interface to the wireless communications networks to perform advanced voice services for one or more mobile units in the wireless communications networks, wherein the advanced voice services include an instant two-way half-duplex voice call within a group of the mobile units comprising a Push-to-Talk-over-Cellular (PoC) call session;
    wherein both the servers and the mobile units that use the advanced group services communicate with each other using control messages within the wireless communications networks, and at least one of the servers switches voice messages for the advanced group services between the mobile units across the wireless communications networks;
    wherein at least one of the servers manages the PoC call session by acting as an arbitrator for the PoC call session and controls the sending of the control messages and the voice messages to and from the mobile units; and
    wherein at least one of the servers exchanges messages with the mobile units, in order to indicate that a user is neither online or offline, but is temporarily unreachable or unavailable.

2. The system of claim 1, wherein the user that is temporarily unreachable or unavailable has an internal presence state called a "Temporary Unreachable" (TU) state.

3. The system of claim 1, wherein the user is temporarily unreachable or unavailable due to connectivity issues with the user's mobile unit in the wireless communications networks.

4. The system of claim 1, wherein presence information for the user is distributed from at least one of the servers to one or more watchers.

5. The system of claim 4, wherein the presence information for the user distributed to the watchers indicates that the user is offline when the user is temporarily unreachable or unavailable.

6. The system of claim 1, wherein the user's mobile unit detects that the user is temporarily unreachable or unavailable.

7. The system of claim 1, wherein the user's mobile unit sends one or more messages to at least one of the servers to indicate that the user is online, after the user has been temporarily unreachable or unavailable.

8. The system of claim 7, wherein the messages comprise a presence publication, a call origination, or an alert origination.

9. The system of claim 1, wherein one or more timers are implemented to determine how long the user's mobile unit must remain connected to the wireless communications networks, before the user's mobile sends a message to at least one of the servers to indicate that the user is online.

10. The system of claim 1, wherein at least one of the servers detects that the user is temporarily unreachable or unavailable.

11. The system of claim 1, wherein at least one of the servers unsuccessfully communicates messages with the user's mobile unit for a configured number of times at configured intervals, before it determines that the user is temporarily unreachable or unavailable.

12. The system of claim 11, wherein the messages comprise a presence notification, a call termination, or an alert termination.

13. The system of claim 1, wherein at least one of the servers successfully communicates messages with the user's mobile unit for a configured number of times at configured intervals, before it determines that the user is online, after the user has been temporarily unreachable or unavailable.

14. The system of claim 13, wherein the messages comprise a presence notification, a call termination, or an alert termination.

15. A method of providing advanced voice services in one or more wireless communications networks, comprising:
    interfacing one or more servers to the wireless communications networks to perform advanced voice services for one or more mobile units in the wireless communications networks, wherein the advanced voice services include an instant two-way half-duplex voice call within a group of the mobile units comprising a Push-to-Talk-over-Cellular (PoC) call session;

wherein both the servers and the mobile units that use the advanced group services communicate with each other using control messages within the wireless communications networks, and at least one of the servers switches voice messages for the advanced group services between the mobile units across the wireless communications networks;

wherein at least one of the servers manages the PoC call session by acting as an arbitrator for the PoC call session and controls the sending of the control messages and the voice messages to and from the mobile units; and wherein at least one of the servers exchanges messages with the mobile units, in order to indicate that a user is neither online or offline, but is temporarily unreachable or unavailable.

* * * * *